United States Patent [19]

Kanebako et al.

[11] Patent Number: 4,514,149
[45] Date of Patent: Apr. 30, 1985

[54] CUTTING FLUID SUPPLY APPARATUS

[75] Inventors: Hiromu Kanebako; Yasukiro Hisatomi, both of Chiba, Japan

[73] Assignee: Kuroda Precision Industries Ltd., Japan

[21] Appl. No.: 541,547

[22] Filed: Oct. 13, 1983

[30] Foreign Application Priority Data

May 7, 1983 [JP] Japan .................... 58-79959

[51] Int. Cl.³ .................... F04B 9/08; F15B 21/02
[52] U.S. Cl. ........................ 417/403; 91/40; 137/624.14
[58] Field of Search ............ 417/403, 404, 397; 91/40; 137/624.14

[56] References Cited

U.S. PATENT DOCUMENTS 3,396,873 8/1968 Nef .................... 417/403 X
3,516,763 6/1970 Manton .................... 417/403
3,872,876 3/1975 Bachman .................... 91/40 X Primary Examiner—Leonard E. Smith
Attorney, Agent, or Firm—Kalish & Gilster

[57] ABSTRACT

A system for providing a high pressure pulsating flow of cutting fluid includes a piston pump having a piston cylinder for pumping the cutting fluid and an air cylinder for reciprocatingly actuating the piston cylinder. An air-operated direction change-over valve controls supplying of air to one end of the air cylinder or the other from a compressed air source. A pulse frequency setting unit, including a fluidic NOT device, controls the position of the change-over valve pneumatically thereby determining the frequency of reciprocation of the air cylinder and thereby the frequency of pulsations in flow of the cutting fluid.

2 Claims, 4 Drawing Figures

CUTTING FLUID SUPPLY APPARATUS

BACKGROUND AND SUMMARY OF THE INVENTION

This invention relates to a cutting fluid supply apparatus supplying a high-pressure pulsating jet of cutting fluid to a drill or other cutting tool. More particularly, the present invention relates to a cutting fluid supply apparatus which generates a high-pressure pulsating jet flow utilizing a piston pump.

When boring by a drill, a high-pressure jet of cutting fluid is supplied directly from a coolant supply system to the tool edges through an oil aperture formed in the drill, in order to cool the tool edges effectively, force out and remove the resultant chips, shorten the operation time, extend the service life of the tool during deep boring work, and improve the accuracy of the work surface.

It is an object of the present invention to provide a cutting fluid supply apparatus of improved nature.

It is a further object of the invention to provide such a cutting fluid supply apparatus which provides forceful, strongly pulsing flow of cutting fluid under all cutting conditions, maintaining pulsing of the discharge flow irrespective of changes in a work undergoing cutting and variations in the oil aperture associated with such cutting.

It is additionally an object of the invention to ensure that the frequency of pulsations in the discharge of cutting fluid is maintained at a predetermined value irrespective of changes of passage resistance resulting during cutting.

It is also an object of the invention to provide such a cutting fluid supply apparatus which maintains and ensures the cooling effect of continued supply of cutting fluid; which retains the capacity of the cutting fluid to discharge chips from the work phase during cutting; which avoids adverse effects of change in the flow of the cutting fluid during cutting; which maintains the surface life of the cutting tool; and which avoids deterioration of the work time or accuracy of the work surface.

It is also an object of the present invention to provide such apparatus which is relatively simple, highly reliable, long lasting, and durable in usage.

Other objects will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
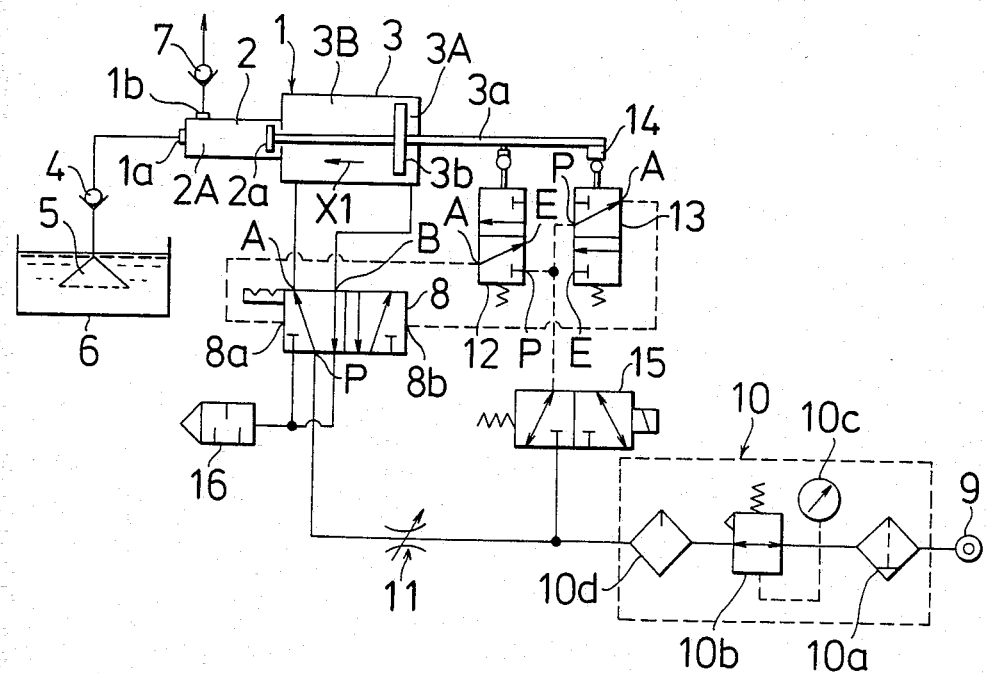
FIG. 1 is a circuit diagram of a conventional cutting fluid supply apparatus.

The system shown in FIG. 1 has been known in the past as a coolant supply system supplying a high-pressure pulsating jet of cutting fluid of the kind described above. In the drawing, reference numeral 1 represents a piston pump consisting of a pump cylinder 2 supplying cutting fluid and an air cylinder 3 reciprocating the pump cylinder 2. A cutting fluid suction port 1a of this pump cylinder 2 communicates with a tank 6 via a check valve 4 that opens during the suction operation of the pump cylinder 2, and a strainer 5. A discharge port 1b of the pump cylinder 2 is connected to the main shaft of a tool, not shown, via a check valve 7 that opens when the pump cylinder 2 is discharging, so that a pulsating jet of cutting fluid ejected from the pump cylinder 2 is supplied to an oil aperture in the tool, such as a drill, attached to the main shaft. Reference numeral 8 represents a direction change-over valve for pilot operation by which the air cylinder 3 for driving the pump cylinder 2 is made to reciprocate. A compressed air source 9 in the factory is connected to a port P of this change-over valve 8. An air-cleaning unit 10 consisting of an air filter 10a, an air pressure regulating valve 10b, a pressure gauge 10c, and a lubricator 10d, and a flow rate regulating valve 11 for speed control, which is equipped with a check valve, is provided series in the air passage between the compressed air source 9 and the direction change-over valve 8. Reference numeral 12 represents a limit valve detecting the forward end of the stroke of the air cylinder 3, and reference numeral 13 a limit valve detecting the rearward end of the stroke of the air cylinder 3. These limit valves 12 and 13 set the stroke of the air cylinder 3 and are changed over independently by a dog 14 provided on a piston rod 3a of the air cylinder 3. The compressed air from the air cleaning unit 10 is supplied to a port P of each limit valve 12, 13 via an electromagnetic valve 15 of the solenoid-operated spring offset type. Ports A and B of the limit valves 12 and 13 are connected to pilot ports 8a, 8b at both ends of the direction change-over valve 8, respectively. Reference numeral 16 represents a muffler connected to an exhaust port of the direction change-over valve 8.

When a high-pressure pulsating jet of cutting fluid is generated and supplied to the oil apertures of a drill in the cutting fluid supply apparatus of the construction described above, the solenoid of the electromagnetic valve 15 is actuated and the valve is changed over from the normal position shown in FIG. 1 to an operating position toward the right-hand side. The compressed air from the air cleaning unit 10 is then supplied to the ports P of the limit valves 12, 13 through the electromagnetic valve 15. It is assumed that the air cylinder 3 is positioned at rearward end of its stroke in this case, as shown in FIG. 1. The dog 14 engages with the limit valve 13 and changes the limit valve over so that its port A communicates with the pilot port 8b of the direction change-over valve 8. Accordingly, the compressed air passing through the electromagnetic valve 15 is supplied to the pilot port 8b of the direction change-over valve 8 as a pilot pressure through the limit valve 13, and changes the direction change-over valve 8 over to the state shown on the right in FIG. 1. The compressed air from the air cleaning unit 10 passing through the flow regulating valve 11 is therefore supplied to a chamber 3A of the air cylinder 3 through the direction change-over valve 8, and makes the piston 3b move forward in the direction of the arrow X1. As the piston 3b moves, the piston 2b of the pump cylinder 2 connected to this piston 3b also moves forward and ejects the cutting fluid, which has been sucked up to fill the chamber 2A completely, through the check valve 7, and supplies it to the oil apertures in the drill.

When the air cylinder 3 reaches the forward end of its stroke, the dog 14 engages with the limit valve 12 to change it over from the normal position shown in FIG. 1 to an operating position on its upper side. In this case, port A of the limit valve 12 communicates with the pilot port 8a of the direction change-over valve 8. (Incidentally, the limit valve 13 returns to its normal position on the lower side the instant the dog 14 leaves it, and the pilot pressure that was applied to the pilot port 8b of the direction change-over valve 8 is exhausted through the port E.) Accordingly, the compressed air passing through the electromagnetic valve 15 is supplied as pilot pressure from the limit valve 12 to the pilot port 8a of the direction change-over valve 8, and changes the direction change-over valve over to the state shown in FIG. 1. The compressed air passing through the flow rate regulating valve 11 is therefore supplied to the chamber 3B of the air cylinder 3 and makes the piston 3b move backward. This makes the piston 2a of the pump cylinder 2 move backward also, so that the cutting fluid within the tank 6 is sucked into the chamber 2A through the check valve 4.

Thereafter, the limit valves 13 and 12 are engaged and disengaged alternately by the rearward and forward strokes of the air cylinder 3 in the same way as described above, and the direction change-over valve 8 is switched over. Simultaneously with the reciprocating motion of the air cylinder 3, the high-pressure cutting fluid is ejected in a pulse-like manner from the discharge port 1b.

The conventional cutting fluid supply apparatus described above has the problem that a strongly pulsing flow of cutting fluid cannot be secured unless a contraction which increased the flow resistance is provided in the discharge passage for the cutting fluid, that is unless the diameter of the oil aperture of the tool is made small to limit the flow of the strongly pulsing cutting fluid. However, if such a contraction is provided, or if the diameter of the tool is reduced so that the diameter of the oil aperture inevitably becomes smaller as well, so that the motion (in the discharge direction) of the piston pump 1 is limited, the number of reciprocations decreases, and the frequency of the ejections of the pulses of cutting fluid from the pump cylinder 2 also decreases. In the worst case, the pulsating of the discharge flow disappears and it becomes virtually a continuous flow. This problem results from the fact that the piston rod of the pump strikes the limit valves so as to make the pump reciprocate through a predetermined stroke.

If the frequency of the pulses in the cutting fluid drops, the cooling effect on the edges of the tool drops, the service life of the tool is reduced, and the capacity of discharging the chips from the work face also drops. Eventually, adverse effects on the work time and the accuracy of the work surface will occur.

In order to eliminate this problem with the prior art, the present invention is directed to provide a cutting fluid supply apparatus which can ensure that the frequency of pulsations in the discharged cutting fluid is at a predetermined value, irrespective of passage resistance on the discharge side.

The cutting fluid supply apparatus accomplishing the above object of the present invention comprises a piston pump consisting of a piston cylinder supplying cutting fluid and an air cylinder driving the piston cylinder, a direction change-over valve making the air cylinder reciprocate, a compressed air source supplying compressed air to the air cylinder, and a pulse frequency setting unit changing over and controlling the direction change-over valve within time limits and having a self-oscillating function of determining the frequency of pulsations in the discharged cutting fluid.

Hereinafter, an embodiment of the present invention will be described with reference to the accompanying drawings.

Figure 2:
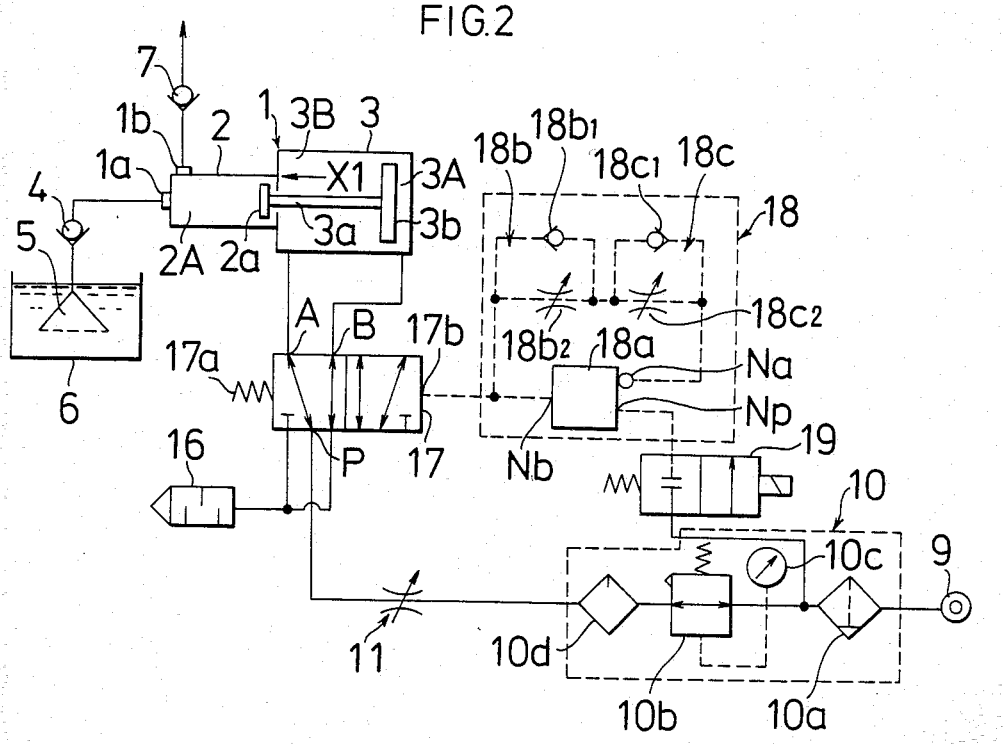
FIG. 2 is a circuit diagram of a cutting fluid supply apparatus in accordance with one embodiment of the present invention.

FIG. 2 is a circuit diagram of a cutting fluid supply apparatus in accordance with an embodiment of the present invention. In the drawing, like reference numerals are used to identify constituents similar to those in FIG. 1. Reference numeral 17 represents a direction change-over valve of the return-spring type of pilot-operated system. This direction change-over valve 17 is used to make the air cylinder of the piston pump 1 reciprocate. Ports A and B are connected to chambers 3A and 3B of the air cylinder 3, respectively. The compressed air source 9 is connected to a port P of the direction change-over valve 17 via a flow rate regulating valve 11 and an air cleaning unit 10. A muffler 16 is connected to the exhaust port thereof.

Reference numeral 18 represents a pulse frequency setting unit having a self-oscillating function controlling the change-over pilot pressure of the direction change-over valve 17. It consists of a fluidic logic inverting device, or so-called NOT device 18a and two flow rate regulating valves 18b and 18c each equipped with check valves. A supply port $N_p$ of the fluidic NOT device 18a is connected to part of the air cleaning unit 10a between the filter 10a and the air pressure regulating valve 10b via a two-way electromagnetic valve 19 of the spring-return type.

Figure 3:
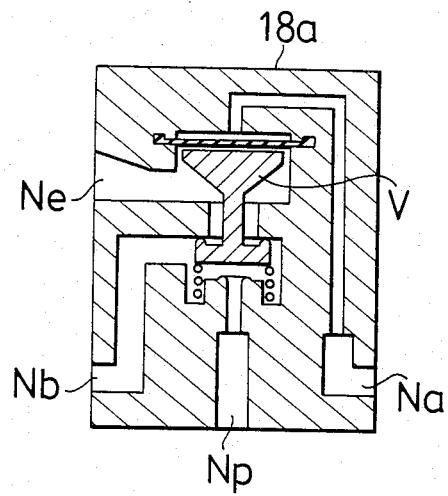
FIG. 3 is a section through, the structure a NOT device.

An output port $N_b$ of the NOT device 18a is connected to a pilot passage port 17b of the direction change-over valve 17, and also to an input port $N_a$ of the NOT device 18a via two flow rate regulating valves 18b, 18c equipped with check valves. As shown in FIG. 3, a valve V of the NOT device 18a is normally pushed upward by the force of a spring so that the feed port $N_p$ and the output port $N_b$ communicate with each other, an exhaust port $N_e$ is closed by the valve V, the input port $N_a$ is connected to a chamber above the valve V, and air pressure from the input port $N_a$ pushes the valve V downward.

The operation of the apparatus of the present invention constructed as described above will now be explained.

To supply the pulsating cutting fluid to the oil aperture of the tool, the solenoid of the electromagnetic valve 19 is first excited so as to change the valve over from the normal position shown in FIG. 2 to an operating position toward the right-hand side. Compressed air passing through the filter 10a is supplied to the NOT device 18a of the pulse frequency setting unit 18 through the electromagnetic valve 19, and is supplied to the pilot port 17b of the direction change-over valve 17 from the feed port $N_p$ via the output port $N_b$ of the NOT device 18a, thereby changing over the direction change-over valve 17 from the normal position shown in FIG. 2 to an operating position toward the opposite side. In consequence, compressed air from the air cleaning unit 10 passing through the flow rate regulating valve 11 is supplied to the chamber 3A of the air cylinder 3 through the direction change-over valve 17, and make the piston 3b move forward in the direction of the arrow X1. As the piston 3b moves, the piston 2A of the pump cylinder 2 which is connected to it also moves forward and ejects the cutting solution, which fills the chamber 2A completely, through the check valve 7 and supplies it to the oil aperture of the drill.

The compressed air for the pilot operation, supplied to the direction change-over valve 17 through the NOT device 18a, changing the direction change-over valve 17 over to the operating position, as described flows into the input port $N_a$ of the NOT device 18a through a check valve $18b_1$ of one of the flow rate regulating valves 18b equipped the check valves forming the pulse frequency setting unit 18, and through a throttle valve $18c_2$ of the other flow rate regulating valve 18c. When the inflow pressure reaches a predetermined value after the passage of a predetermined period of time due to the regulating operation of the throttle valve $18c_2$, the compressed air pushes the valve V downward, cuts off the supply of the pilot pressure from the electromagnetic valve 19 to the direction change-over valve 17, and simultaneously releases the pilot port of the direction change-over valve 17 to the atmosphere from the exhaust port $N_e$ of the NOT device 18a. Accordingly, the direction change-over valve 17 is immediately changed over to its normal position shown in FIG. 2 by a built-in spring 17a. When the direction change-over valve 17 returns to its normal position, the compressed air passing through the flow rate regulating valve 11 is supplied to the chamber 3B of the air cylinder 3, moving its piston 3b backward, and at the same time also moving the piston 2a of the pump cylinder 2 backward, so that the cutting fluid in the tank 6 is sucked into the chamber 2A through the check valve 4. The air pressure that has been pushing the valve V from the input port $N_a$ in the NOT device is released to the atmosphere from the exhaust port $N_e$ of the NOT device through a check valve $18c_1$ of the other flow rate regulating valve 18c equipped with a check valve, and through a throttle valve $18b_2$ of the first of the flow rate regulating valves 18b equipped with check valves. As the air pressure that has been pushing the valve V thus disappears, the valve V returns to the position shown in FIG. 3, and the pilot pressure is supplied to the pilot port 17b of the direction change-over valve 17 as described previously. Accordingly, these operations are repeated. In this manner, the pulse frequency setting unit 18 has a self-oscillating function provided by the NOT device and the two flow rate regulating valves equipped with check valves.

Thereafter, when the direction change-over valve 17 is changed over by the pilot pressure occurring with the self-oscillating function of the pulse frequency setting unit 18 in the same way as described above, the air cylinder 3 as well as the pump cylinder 2 reciprocate so that high-pressure pulses of cutting fluid are ejected from the discharge port 1b.

Figure 4:
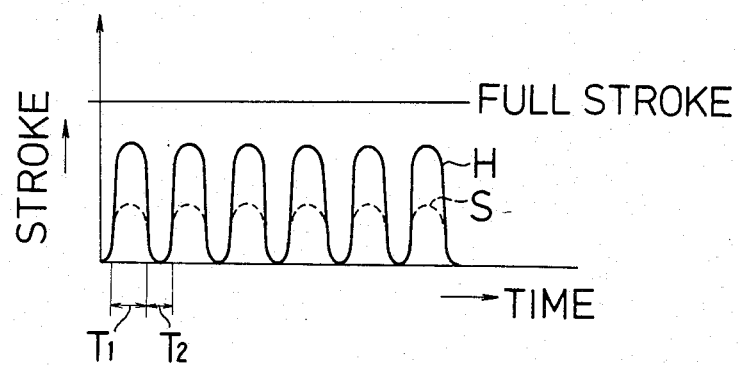
FIG. 4 a is a graph of the suction and discharge waveforms of the pulsating cutting fluid in the present invention.

FIG. 4 shows the suction and discharge waveforms of the pulsating cutting fluid due to the reciprocation of the piston pump 1. The discharge time T1 of the cutting fluid is determined by the throttle valve $18c_2$ of the pulse frequency setting unit 18, while the suction time T2 of the cutting fluid is determined by the throttle valve $18b_2$. As shown in FIG. 4, H is the waveform when the passage resistance on the discharge side is small, and S that when the passage resistance is large. In other words, this means that the discharge time T1 and suction time T2 can be set to predetermined values, irrespective of the stroke of the piston pump 1.

For the reason described above, a pulsating flow such as that shown in FIG. 4 can be obtained reliably even if the resistance of the passage on the discharge side, from which the pulsating cutting fluid is ejected, becomes large such as when the diameter of the oil aperture of the tool is reduced, for example, without forming the continuous flow which occurs in the prior-art apparatus.

Incidentally, if the piston pump 1 does not reciprocate fully within its stroke range, the discharge flow rate of the pump drops due to the decrease in the stroke. However, since the flow rate corresponds to the oil aperture bored in the tool, no problems occur in the cooling of the edges of the tool, removal of chips, and so forth. In other words, this means that a single cutting fluid supply pump can be used for a variety of tools.

Although the pulse frequency setting unit 18 is shown composed of a NOT device and flow rate regulating valves equipped with check valves in the embodiment described above, the setting unit 18 is not limited to such a construction, but may be constructed in various ways such as by using an electric timer circuit, for example.

As described above, the present invention employs a control system in which the reciprocation of the piston pump is controlled by a pulse frequency setting unit having a self-oscillating function. According to this construction, the frequency of pulsations in the discharged cutting fluid can be kept at a predetermined value irrespective of the passage resistance on the discharge side, and pulsating cutting fluid can be discharged. For these reasons, the cooling of the tool edges, forced removal of chips, the service life of the tool, and the accuracy of the work surface are not affected adversely, even if the diameter of the oil aperture in the tool becomes small.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. In a fluid supply apparatus including a piston pump consisting of a piston cylinder for supplying fluid and an air cylinder for reciprocating said piston cylinder;

a direction change-over valve for making said air cylinder reciprocate, said change-over valve being changeable between two positions each providing for reciprocating movement by said air cylinder in a respective direction, such reciprocating movement causing corresponding pulsation in the flow of said fluid;

a compressed air source supplying compressed air to said cylinder through said direction change-over valve;

the improvement comprising:

a pulse frequency controlling means of self-oscillating character for controlling the position of said direction change-over valve within time limits, thereby determining the frequency of pulsations in the flow of said fluid; said pulse frequency controlling means being air operated, being thereby operable by air from said compressed air source, said direction change-over valve being also air-operated in response to air from said compressed air source controlled by said pulse frequency controlling means;

said pulse frequency controlling means comprising a fluidic NOT device having an air supply port for receiving compressed air from said source, an output port for supplying the compressed air to said direction change-over valve, and an input port for causing the output port to provide compressed air from said source as as inverted function of air being supplied to said input port;

said pulse frequency controlling means including flow rate controlling valve means interconnecting said output port and said input port of said NOT device for controlling said time limits and comprising first and second flow rate regulating valves connected in series between said output port and said input port of said NOT device, said first and second check valves connected across the respective regulating valves to permit air to flow for a given direction between said input and output ports only through one of said regulating valves, said regulating valves each being adjustable respectively to provide a first time limit for a fluid intake stroke of said piston cylinder and a second time limit for a fluid dischage stroke of said piston cylinder.

2. In a fluid supply apparatus according to claim 1, said fluid being a cutting fluid delivered at high pressure by said piston cylinder.

* * * * *

UNITED STATES PATENT AND TRADEMARK OFFICE
CERTIFICATE OF CORRECTION

PATENT NO. : 4,514,149

DATED : April 30, 1985

INVENTOR(S) : Hiromu Kanebako et al

It is certified that error appears in the above-identified patent and that said Letters Patent is hereby corrected as shown below:

Claim 1, column 8, line 2, "said" (third occurrence) should be "and".

Claim 1, column 8, line 11, "dischage" should be "discharge".

Signed and Sealed this

Twenty-seventh Day of August 1985

[SEAL]

Attest:

DONALD J. QUIGG

Attesting Officer        Acting Commissioner of Patents and Trademarks